(12) United States Patent
Imai et al.

(10) Patent No.: US 10,445,041 B2
(45) Date of Patent: Oct. 15, 2019

(54) IMAGE FORMING APPARATUS, CONTROL METHOD OF IMAGE FORMING APPARATUS, AND STORAGE MEDIUM

(71) Applicant: CANON KABUSHIKI KAISHA, Tokyo (JP)

(72) Inventors: Yasuhiro Imai, Yokohama (JP); Hisashi Terae, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/151,495

(22) Filed: Oct. 4, 2018

(65) Prior Publication Data

US 2019/0114125 A1   Apr. 18, 2019

(30) Foreign Application Priority Data

Oct. 12, 2017  (JP) ................................ 2017-198400
Jun. 6, 2018   (JP) ................................ 2018-108996

(51) Int. Cl.
*G06F 3/12*   (2006.01)
*H04N 1/00*   (2006.01)
*G06K 9/46*   (2006.01)
*G06K 15/00*  (2006.01)

(52) U.S. Cl.
CPC .......... *G06F 3/1256* (2013.01); *G06F 3/1208* (2013.01); *G06K 9/46* (2013.01); *H04N 1/00177* (2013.01); *H04N 1/00408* (2013.01)

(58) Field of Classification Search
None
See application file for complete search history.

(56) References Cited

U.S. PATENT DOCUMENTS

2014/0363187 A1*  12/2014  Kanamoto  ......... G03G 15/5016
                                                         399/81

FOREIGN PATENT DOCUMENTS

JP   2007-241460 A   9/2007
JP   2015-202667 A   11/2015

* cited by examiner

*Primary Examiner* — Dov Popovici
(74) *Attorney, Agent, or Firm* — Venable LLP

(57) ABSTRACT

An image forming apparatus is capable of performing hold printing that holds a received print job and performs the print job in accordance with instructions to perform printing from a user, and includes a document type specification unit configured to specify a document type from the print job, a setting rule acquisition unit configured to acquire a setting rule in which print setting values are associated with a document type, and a setting value change unit configured to change a print setting value of the print job based on a setting rule of a document type corresponding to a document type specified by the document type specification unit, which is acquired by the setting rule acquisition unit. In addition, a display control unit is configured to perform control so as to display the print job whose print setting value is changed by highlighting the print job.

16 Claims, 21 Drawing Sheets

Job list screen | Logout

Adachi

| | Document name | Number of pages | Print setting | | | Document type | Automatic setting accuracy |
|---|---|---|---|---|---|---|---|
| ☑ | estimation request sheet A Inc. | 10 | one-sided | color | 1in 1 | one copy | estimation request sheet ▶ 90% |
| ☐ | estimation request sheet B Inc. | 20 | one-sided | color | 1in 1 | one copy | |
| ☑ | specification sheet 1 | 5 | double-sided | mono-chrome | 2in 1 | three copies | |

Update  ◁ ▽

Start print 1000, 1001, 1002, 1003

FIG.10B

Job list screen | Logout

Adachi

Update ◁ ▷

| | Document name | Number of pages | Print setting | | | Document type | Automatic setting accuracy |
|---|---|---|---|---|---|---|---|
| ☑ | estimation request sheet _A Inc. | 10 | one-sided | color | 1in 1 | one copy | estimation request sheet 90% ▶ |
| ☐ | estimation request sheet _B Inc. | 20 | one-sided | color | 1in 1 | one copy | estimation request sheet 90% |
| ☑ | specification sheet 1 | 5 | double-sided | mono-chrome | 2in 1 | three copies | specification sheet 6%  contract sheet 3% |

1010, 1011, 1012, 1013

Start print

FIG.10C

Job list screen | Logout

Adachi

| | Document name | Number of pages | Print setting | | | Document type | Automatic setting accuracy |
|---|---|---|---|---|---|---|---|
| ☑ | estimation request sheet A Inc. | 10 | one-sided | color | 1in 1 | one copy | |
| ☐ | estimation request sheet B Inc. | 20 | double-sided | color | 1in 1 | two copies | |
| ☑ | specification sheet 1 | 5 | double-sided | mono-chrome | 2in 1 | three copies | specification sheet  ▶  6% |

Update

Start print 1020, 1021, 1022, 1023, 1024

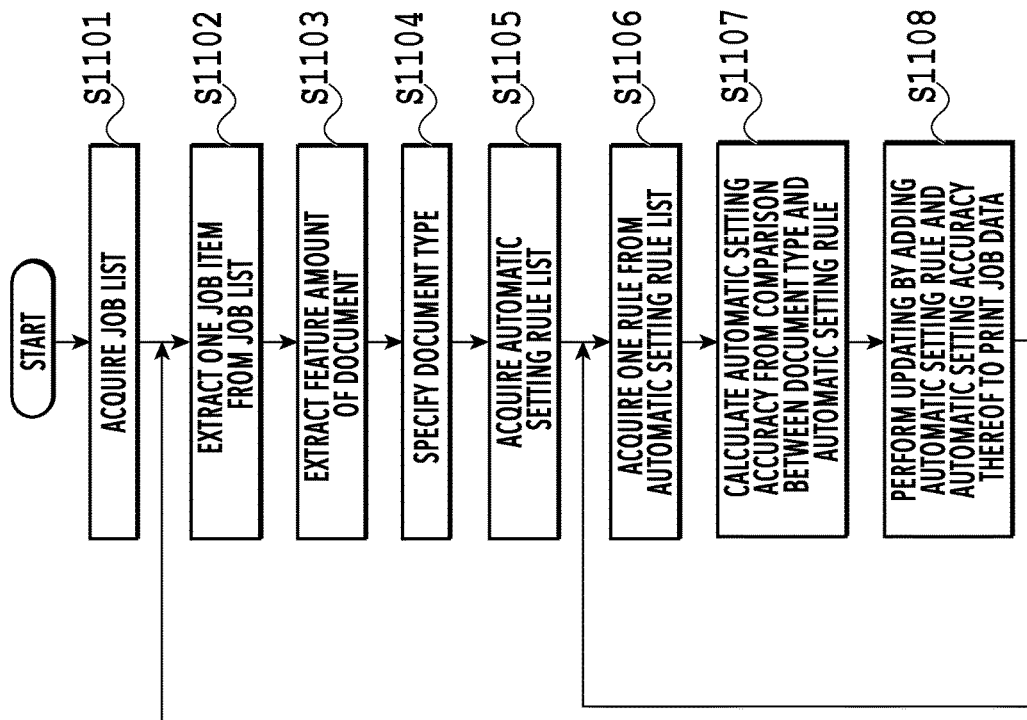

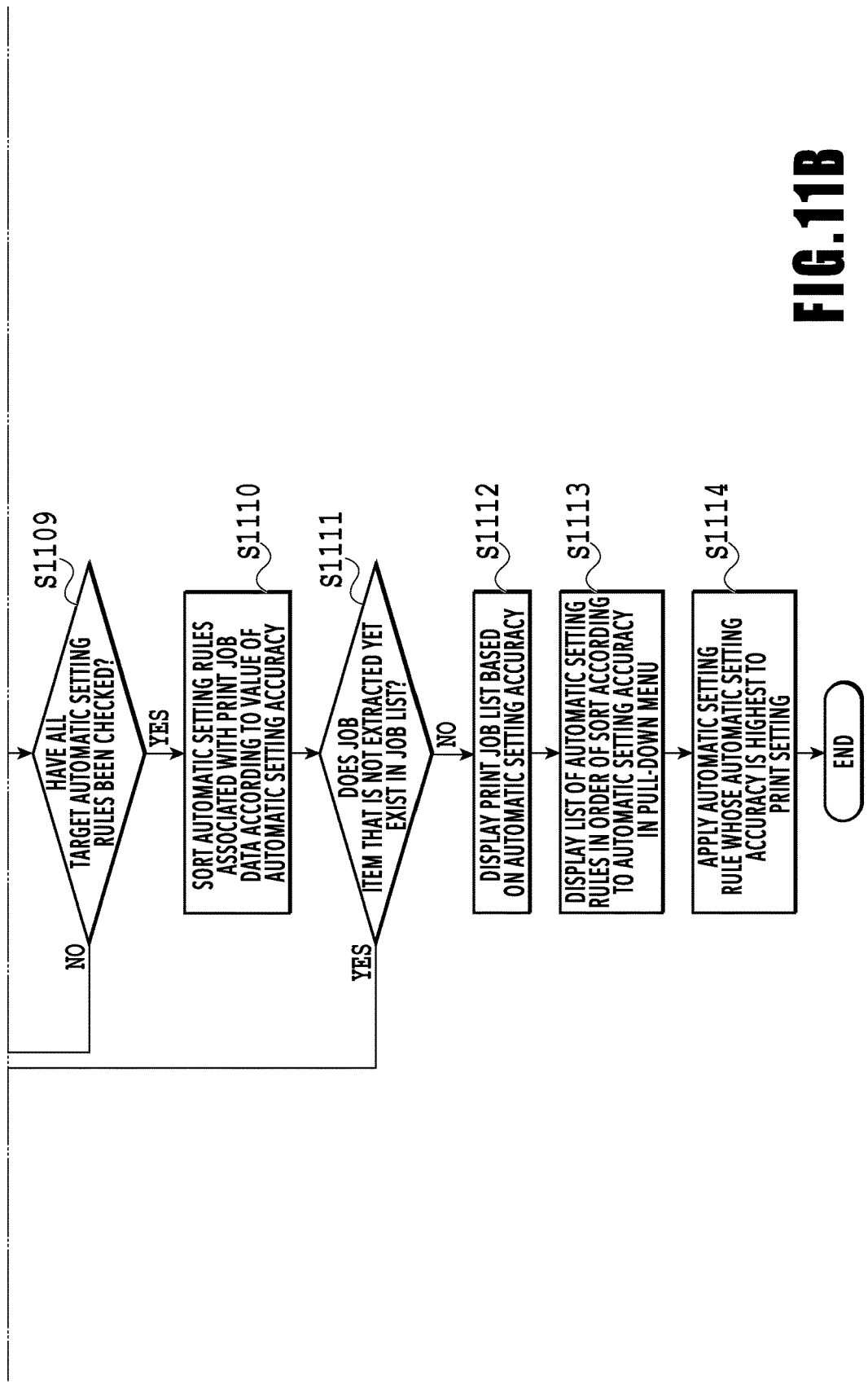

FIG.12

Job list screen | Logout

Adachi

| | Document name | Number of pages | Print setting | | | Document type | Automatic setting accuracy |
|---|---|---|---|---|---|---|---|
| ☑ | estimation request sheet A Inc. | 10 | one-sided | color | 1 in 1 | one copy | |
| ☐ | estimation request sheet B Inc. | 20 | one-sided | color | 1 in 1 | one copy | estimation request sheet (fixed) |
| ☑ | specification sheet 1 | 5 | double-sided | mono-chrome | 2 in 1 | three copies | |

◁ ▷  Update

Start print

Job list screen

Adachi

| Document name | Number of pages | Print setting | | | Document type | Automatic setting accuracy |
|---|---|---|---|---|---|---|
| ☑ estimation request sheet A Inc. | 10 | one-sided | color | 1in1 | one copy | |
| ☐ estimation request sheet B Inc. | 20 | one-sided ▶ | | n1 | one copy | estimation request sheet ▶ 90% |
| ☑ specifica-tion sheet 1 | | one-sided 80% | | 2in1 | three copies | |
| | | double-sided long side binding 15% | | | | |
| | | double-sided short side binding 5% | | | | |

◁ ▷

Logout

Update

Start print

| ESTIMATION REQUEST SHEET | | |
|---|---|---|
| ONE-SIDED/DOUBLE-SIDED SETTING | | |
| 1 | ONE-SIDED | 80% |
| 2 | DOUBLE-SIDED LONG SIDE BINDING | 15% |
| 3 | DOUBLE-SIDED SHORT SIDE BINDING | 5% |
| COLOR/WHITE AND BLACK SETTING | | |
| 1 | WHITE AND BLACK | 70% |
| 2 | COLOR | 30% |
| Nup SETTING | | |
| 1 | 2in1 | 50% |
| 2 | 1in1 | 35% |
| 3 | 4in1 | 15% |

FIG.14

Job list screen

Adachi

| Document name | Number of pages | Print setting | | | Document type | Automatic setting accuracy |
|---|---|---|---|---|---|---|
| ☑ estimation request sheet A Inc. | 10 | one-sided | color | 1in 1 | one copy | |
| ☐ estimation request sheet B Inc. | 20 | one-sided | color | 1in 1 | one copy | estimation request sheet  90% details |
| ☑ specification sheet 1 | 5 | double-sided | mono-chrome | 2in 1 | three copies | |

Logout

Update

△ ▽

Start print

FIG. 15A

IMAGE FORMING APPARATUS, CONTROL METHOD OF IMAGE FORMING APPARATUS, AND STORAGE MEDIUM

BACKGROUND OF THE INVENTION

Field of the Invention

The present invention relates to an image forming apparatus that automatically updates a print setting value in accordance with a document type, a control method of an image forming apparatus, and a storage medium.

Description of the Related Art

Conventionally, an image forming apparatus mounting a hold printing function that holds a print job input by a user in an internal auxiliary storage device and performs printing processing at any timing based on instructions of a user is known.

In the image forming apparatus such as this, in a print job that is held, image data to be printed and a print setting value for a setting item of printing are included and usually, the print setting value is set by a user before the print job is input from an information processing apparatus to the image forming apparatus.

However, in the hold printing, there is a case where the rule of a print setting value that should be set for a specific document is not recognized by a user, or a case where a setting mistake by manually setting a print setting value occurs, and therefore, the operability deteriorates sometimes because the setting needs to be performed again from the beginning. Consequently, for example, Japanese Patent Laid-Open No. 2007-241460 has disclosed a method of presenting sets of print settings in order of descending frequency in the case where a user performs printing by storing in advance sets of past print settings in a server on a network.

Further, a technique to classify document types based on the document feature of a print job and to automatically set (update) a print setting value in accordance with the classified document type has also been proposed. In this technique, a print setting value is set automatically by specifying in advance a method of specifying a document type and an association rule between a document type and a print setting value. For example, Japanese Patent Laid-Open No. 2015-202667 has disclosed an information processing apparatus that performs clustering by using a feature amount of already-printed data and changes a print setting value based on the print setting value associated with the clustered class.

However, the technique of Japanese Patent Laid-Open No. 2007-241460 simply displays sets of print settings in order and is insufficient to resolve a manual setting mistake. Further, in the case where the print setting value of a print job held by the hold printing function is automatically changed by using the technique of Japanese Patent Laid-Open No. 2015-202667, a user is not notified of the change, and therefore, it is not possible for a user to recognize that the print setting value at the time of input of the print job is changed. That is, it is not possible for a user to recognize (notice) that the print setting value at the time of input of the print job and the print setting value at the time of execution of printing are different, and therefore, in the case where setting not intended is performed automatically, it is not possible to modify the setting or to abort printing.

The present invention has been made in view of the above-described conventional problem and an object is to cause a user to recognize that the print setting value is changed in the case where the print setting value is change by automatic setting in hold printing. In addition, in view of the case where the automatically set print setting value is modified, a candidate of an appropriate print setting value and information necessary for selecting the candidate are also provided.

SUMMARY OF THE INVENTION

In order to achieve the above-described object, the image forming apparatus of the present invention is an image forming apparatus capable of performing hold printing that holds a received print job and performs the print job in accordance with instructions to perform printing from a user, the image forming apparatus including: a document type specification unit configured to specify a document type from the print job; a setting rule acquisition unit configured to acquire a setting rule in which print setting values are associated with a document type; a setting value change unit configured to change a print setting value of the print job based on a setting rule of a document type corresponding to a document type specified by the document type specification unit, which is acquired by the setting rule acquisition unit; and a display control unit configured to perform control so as to display the print job whose print setting value is changed by highlighting the print job.

Further features of the present invention will become apparent from the following description of exemplary embodiments with reference to the attached drawings.

BRIEF DESCRIPTION OF THE DRAWINGS

FIG. 5A to FIG. 5C are diagrams showing a list screen of held print jobs;

FIG. 8 is a diagram showing a list screen of held print jobs;

FIG. 10A to FIG. 10C are diagrams showing a list screen of held print jobs;

FIG. 11 is a diagram showing the relationship of FIG. 11A and FIG. 11B;

FIG. 11A is a flowchart showing a procedure of processing to generate a list screen of held print jobs;

FIG. 11B is a flowchart showing a procedure of processing to generate a list screen of held print jobs;

FIG. 12 is a diagram showing a list screen of held print jobs;

FIG. 13 is a diagram showing a list screen of held print jobs;

FIG. 14 is a diagram showing a data table; and

FIG. 15A and FIG. 15B are diagrams showing a list screen of held print jobs.

DESCRIPTION OF THE EMBODIMENTS

In the following, preferred embodiments of the present invention are explained in detail with reference to the attached drawings. The following embodiments are not intended to limit the present invention and all combinations of features explained in the present embodiments are not necessarily indispensable to the solution of the present invention.

<Hold Printing System Configuration>

Figure 1:
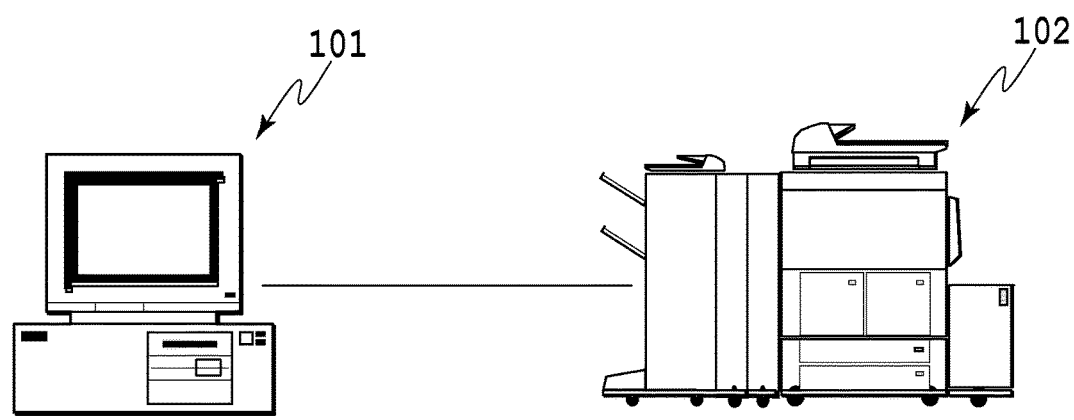
FIG. 1 is a diagram showing a configuration of a hold printing system.

FIG. 1 is a diagram showing a configuration of a hold printing system. As shown in FIG. 1, the hold printing system includes an information processing apparatus 101 and an image forming apparatus 102. Further, the information processing apparatus 101 and the image forming apparatus 102 are connected so as to be capable of communication by a predetermined network (for example, wireless LAN (Local Area Network)). It is also possible to connect the information processing apparatus 101 and the image forming apparatus 102 so as to be capable of communication by a wire, such as a parallel cable, a serial cable, and a USB cable.

In the hold printing system, in the case of generating a print job, the information processing apparatus 101 transmits the print job to the image forming apparatus 102. Upon receipt of the print job from the information processing apparatus 101, the image forming apparatus 102 performs the print job (that is, performs printing processing).

<Hardware Configuration of Image Forming Apparatus>

Figure 2:
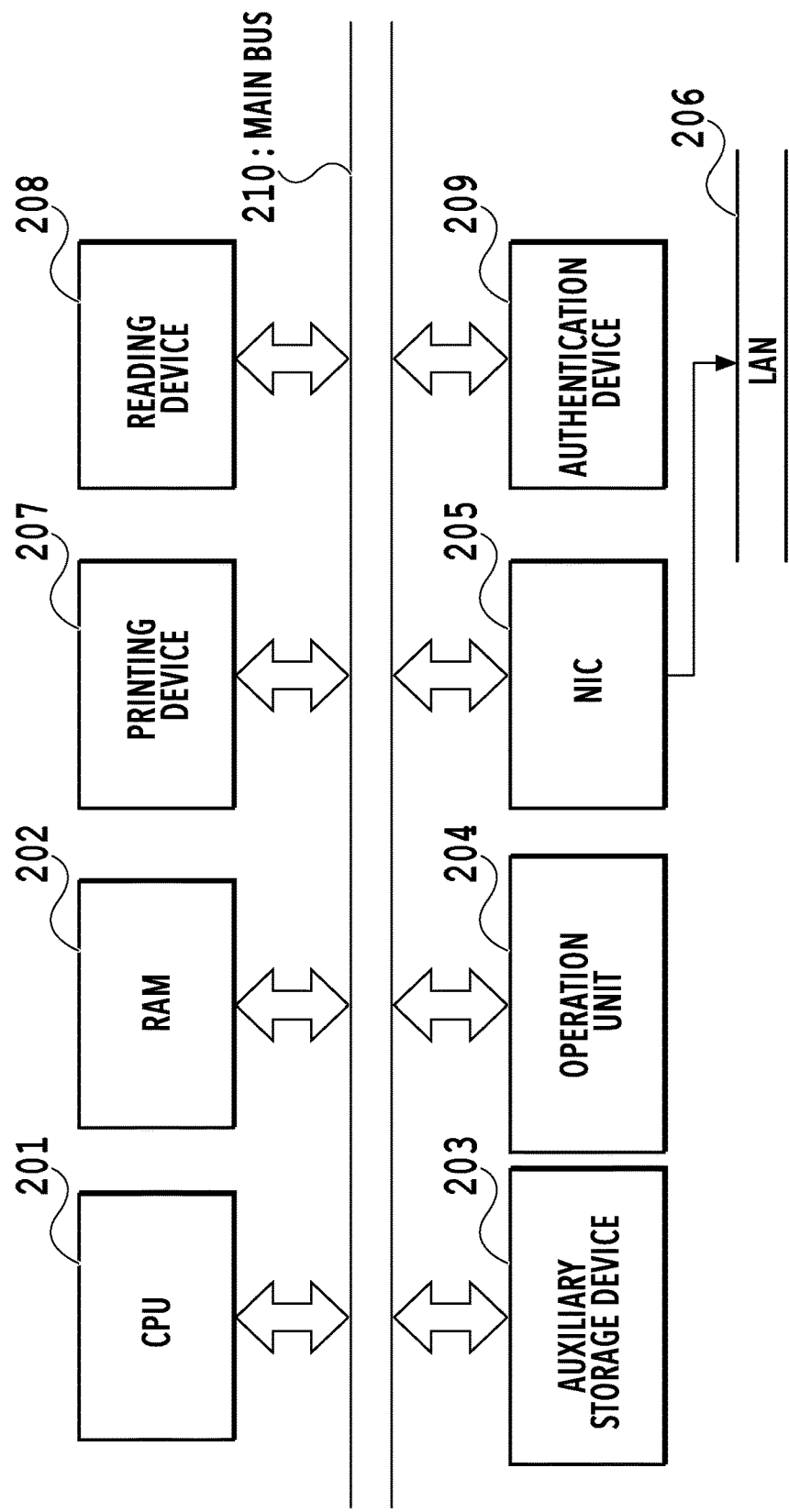
FIG. 2 is a diagram showing a hardware configuration of an image forming apparatus.

FIG. 2 is a diagram showing a hardware configuration of the image forming apparatus 102. A CPU 201 is a central processing unit configured to control the entire image forming apparatus 102. A RAM (Random Access Memory) 202 functions as a work area of the CPU 201.

An auxiliary storage device 203 is, for example, a hard disk, a CD-ROM, and so on, and stores various programs executed by the CPU 201 and various kinds of data used for processing performed by the CPU 201. Further, the auxiliary storage device 203 is also used to temporarily store data, and the like, in place of the RAM 202. The CPU 201 implements a function configuration of the image forming apparatus 102 and processing of flowcharts, to be described later, by reading programs stored in the auxiliary storage device 203 onto the RAM 202 and by executing the programs.

An operation unit 204 is, for example, a liquid crystal display, a touch panel, and so on, and displays the state of the image forming apparatus 102, an error message, and so on, and receives an input relating to setting of a desired print job, and the like. A NIC (Network Interface Controller) 205 is used by the image forming apparatus 102 to perform transmission and reception of data with another network device via a LAN (Local Area Network) 206.

A printing device 207 is a print engine and prints scanned image data and the like on a sheet. It is possible for the printing device 207 to identify the state of sheet feed option (for example, sheet feed cassette and the like) and the state of sheet discharge option (for example, finisher device and the like) relating to the printing processing.

A reading device 208 is a scanner and reads a paper document placed on a document table and generates white and black binary image data, color multivalued image data (that is, print data) and so on. It is possible for the printing device 207 to print image data read by the reading device 208. Further, it is also possible for the printing device 207 to hold image data and a print job in the auxiliary storage device 203 and to perform printing at any timing. This printing is called hold printing.

An authentication device 209 performs login authentication by reading a card held above by a user (that is, card authentication), login authentication from input information input from the operation unit 204 (for example, keyboard input authentication and the like), and so on. The CPU 201, the RAM 202, the auxiliary storage device 203, the operation unit 204, the NIC 205, the printing device 207, the reading device 208, and the authentication device 209 are connected with one another so as to be capable of performing transmission and reception of data via a main bus 210.

<Function Configuration of Image Forming Apparatus>

Figure 3:
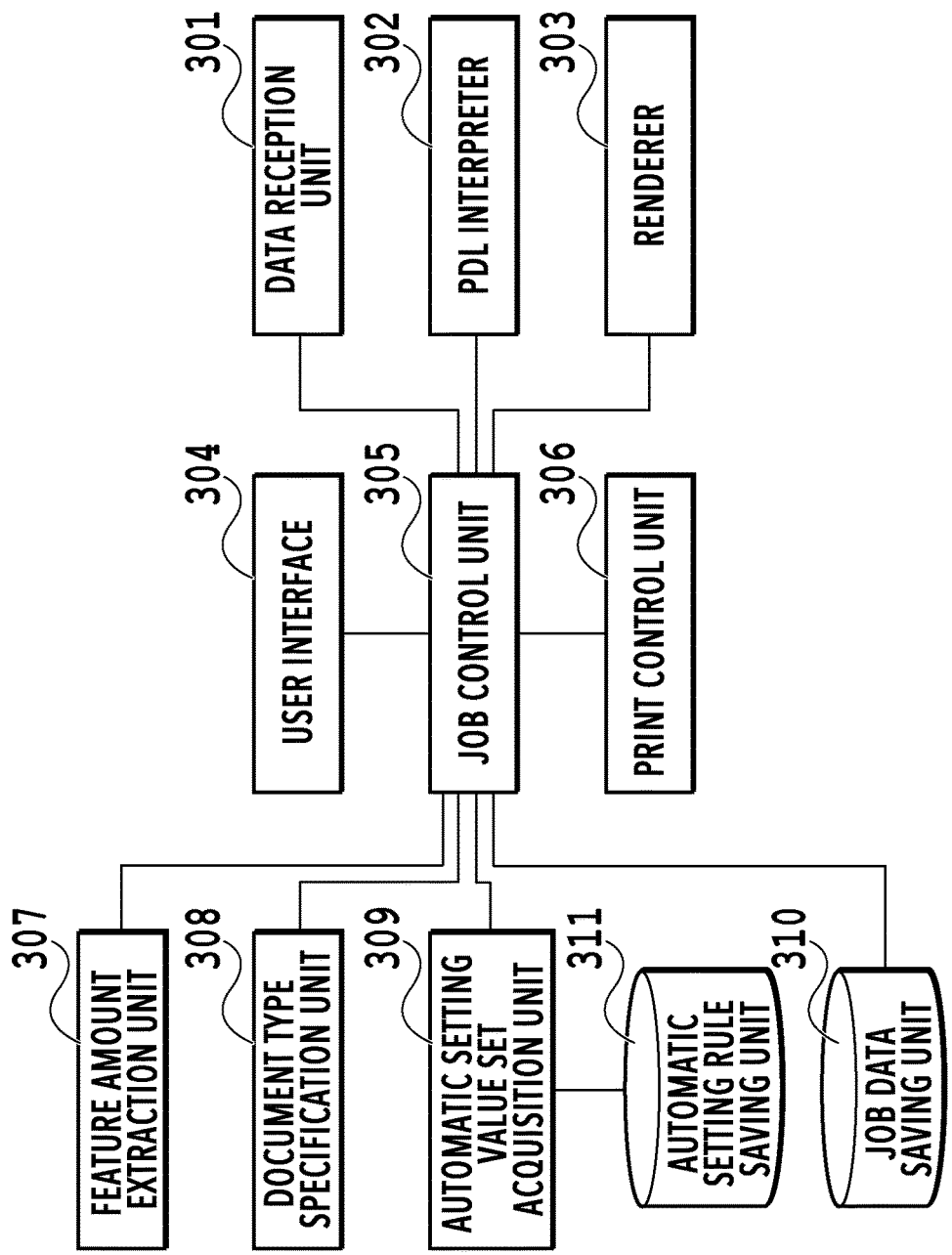
FIG. 3 is a diagram showing a function configuration of the image forming apparatus.

FIG. 3 is a diagram showing a function configuration of the image forming apparatus 102. As shown in FIG. 3, the image forming apparatus 102 includes a data reception unit 301 to an automatic setting rule saving unit 311. Various programs corresponding to the data reception unit 301 to an automatic setting value set acquisition unit 309 are stored in the auxiliary storage device 203 as described above in FIG. 2. Further, a job data saving unit 310 and the automatic setting rule saving unit 311 are predetermined databases and shown as data areas within the auxiliary storage device 203.

The data reception unit 301 receives print job data transmitted from the information processing apparatus 101. Although details will be described later in FIG. 4, the print job data is, for example, PDL data described in a page description language (PDL), setting values relating to printing conditions (that is, print setting values), and the like. The print job data received from the data reception unit 301 is saved in the job data saving unit 310 via a job control unit 305.

A PDL interpreter 302 interprets PDL data and generates a DL, which is intermediate data. The DL generated by the PDL interpreter 302 is saved in the job data saving unit 310 via the job control unit 305. A renderer 303 generates a bitmap image from a DL. Many pieces of processing in the renderer 303 are performed by dedicated hardware, not shown schematically. The bitmap image generated by the renderer 303 is saved in the job data saving unit 310 via the job control unit 305.

A user interface 304 is a display control unit and controls the operation unit 204. The user interface 304 generates data that is displayed on the liquid crystal panel of the operation unit 204 and updates the display on the liquid crystal panel in accordance with an input from the touch panel. Further, in the case where instructions to perform some job are input from the touch panel, the user interface 304 notifies the job control unit 305 of the instructions. For example, the user interface 304 displays and updates a print job list of job data saved (held) in the job data saving unit 310 and notifies the job control unit 305 of the job selection and instructions to perform printing on the job list, which are received from a user.

The job control unit 305 generally controls a job from data reception to printing. A print control unit 306 gives instructions to perform printing to the printing device 207 and sends out a bitmap image. A feature amount extraction unit 307 analyzes PDL data and extracts a feature amount of the document. The feature amount extracted by the feature amount extraction unit 307 is saved in the job data saving unit 310 via the job control unit 305.

A document type specification unit 308 specifies a document type by using the feature amount extracted by the feature amount extraction unit 307. In the document type, a feature amount relating to the document type is defined in advance and the document type specification unit 308 specifies a document type by referring to the feature amount. The document type specified (determined) by the document type specification unit 308 is saved in the job data saving unit 310 via the job control unit 305.

The automatic setting value set acquisition unit 309 acquires "Job setting value set" corresponding to "Document type" based on the rule saved in the automatic setting rule saving unit 311 by instructions (control) of the job control unit 305. That is, the automatic setting value set acquisition unit 309 is a setting rule acquisition unit. The job control unit 305 updates the print setting value in the print job data of the job data saving unit 310 based on acquired "Job setting value set" and adds information indicating that the automatic setting (updating) is performed. Further, the job control unit 305 determines whether or not the print setting value is changed before and after updating and in the case of determining that the print setting value is changed, the job control unit 305 includes information indicating that the print setting value is changed in the information indicating that the automatic setting is performed. Further, the user interface 304 displays the print job whose print setting value is changed by highlighting the print job based on the information indicating that the automatic setting is performed (to be more exact, information indicating that the print setting value is changed).

The job data saving unit 310 stores each of the PDL data, the print setting (print setting value), the DL, the bitmap image, the feature amount, and the document type temporarily or for a long period of time. As shown in Table 1 below, the automatic setting rule saving unit 311 saves "Document type" and "Job setting value set" corresponding thereto in association with each other as the automatic setting rule. It is also possible to manually register the automatic setting rule by a user using a rule registration I/F, not shown schematically, or to automatically register by causing the image forming apparatus 102 to learn job execution logs in the past.

TABLE 1

| Document type | Job setting value set |
| --- | --- |
| estimation request sheet | one-sided, color, 1 in 1, one copy, . . . |
| bill | one-sided, monochrome, 2 in 1, one copy, . . . |
| . . . | |

<Print Job Data>

Figure 4:
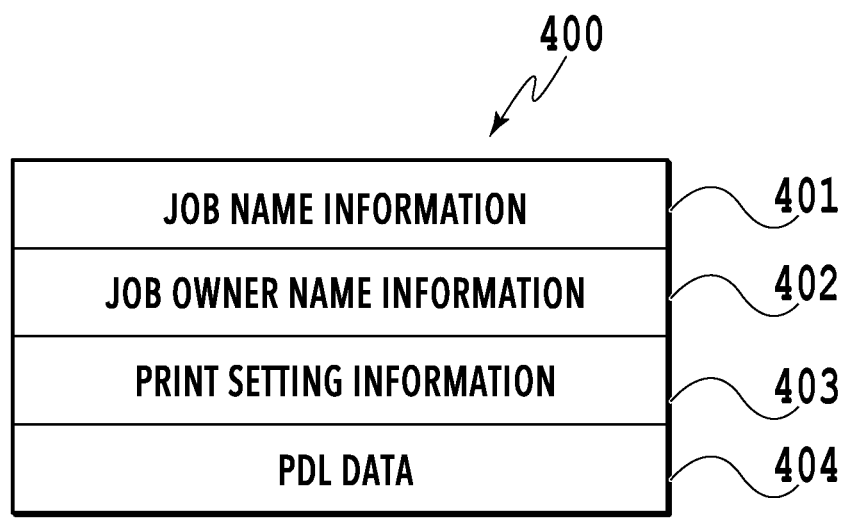
FIG. 4 is a diagram showing print job data.

FIG. 4 is a diagram showing print job data 400 input from the information processing apparatus 101. The print job data 400 is generated by a printer driver of the information processing apparatus 101. The print job data 400 generated by the information processing apparatus 101 is transmitted to the image forming apparatus 102, and then, stored in the auxiliary storage device 203 of the image forming apparatus 102 and managed as a job for hold printing.

As shown in FIG. 4, the print job data 400 includes job name information 401, job owner name information 402, print setting information 403, and PDL data 404. The job name information 401 is the name of a print job input to the image forming apparatus 102 from the information processing apparatus 101. In the information processing apparatus 101, the job owner name information 402 is the name of a job owner who inputs the print job. The print setting information 403 is information on the setting of printing, such as the number of copies setting, the Nup setting, the color mode setting, and the one-sided/double-sided setting, of the print job. The PDL data 404 is information used for performing drawing as described above. Based on the above-contents explained in FIG. 1 to FIG. 4, a first embodiment and a second embodiment in the present invention are explained in detail.

First Embodiment

In the present embodiment, for a held print job, a print setting value is set automatically based on the automatic setting rule saved in the automatic setting rule saving unit 311 (that is, the print setting information 403 on the print job data 400 generated by the printer driver is updated). Then, in the case where the print setting information 403 is updated (changed), the operation unit 204 produces a display capable of causing a user to notice (recognize) that the print setting information 403 is changed into a print setting value different from the print setting value at the time of input of the print job.

Figure 5A:
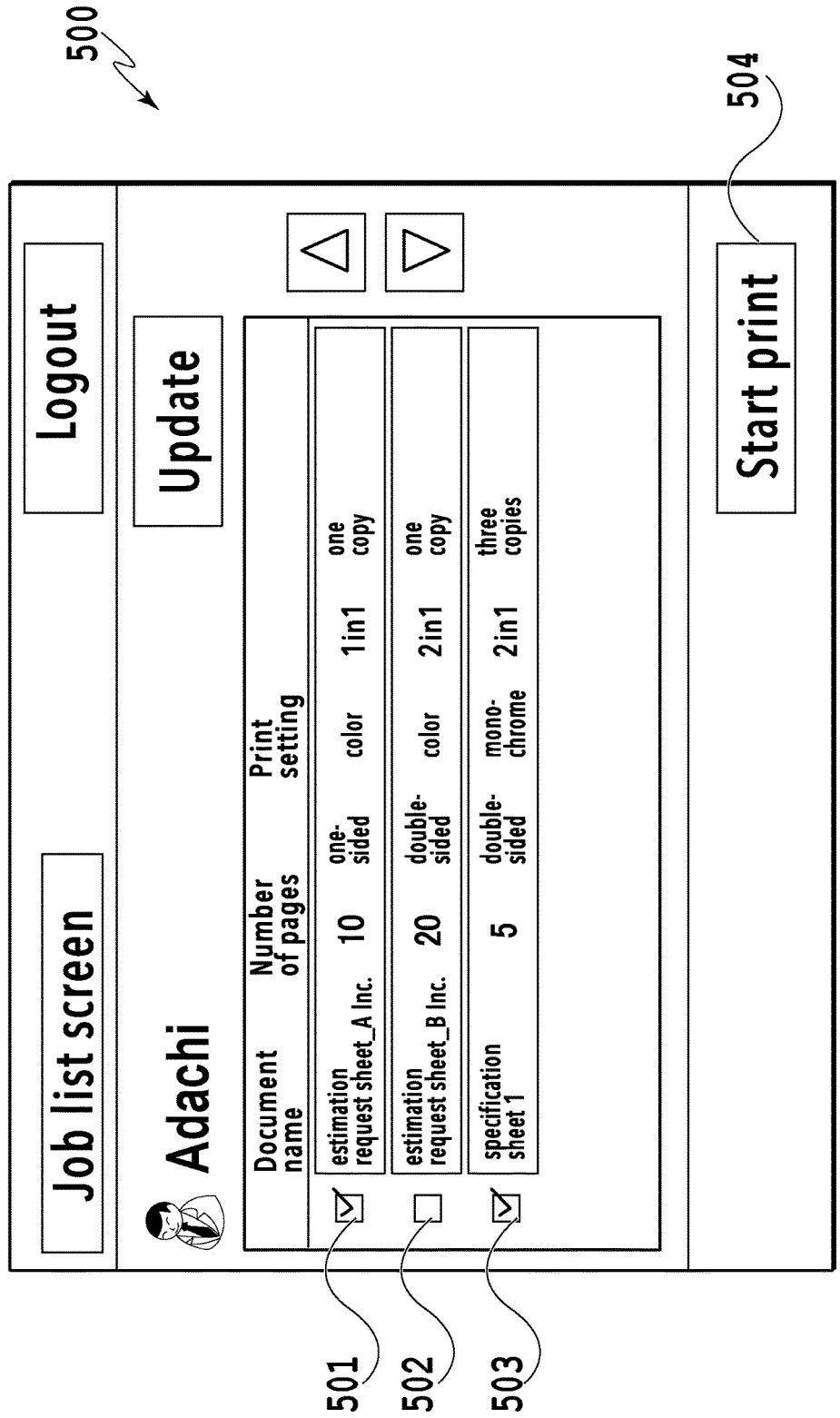
Figure 5B:
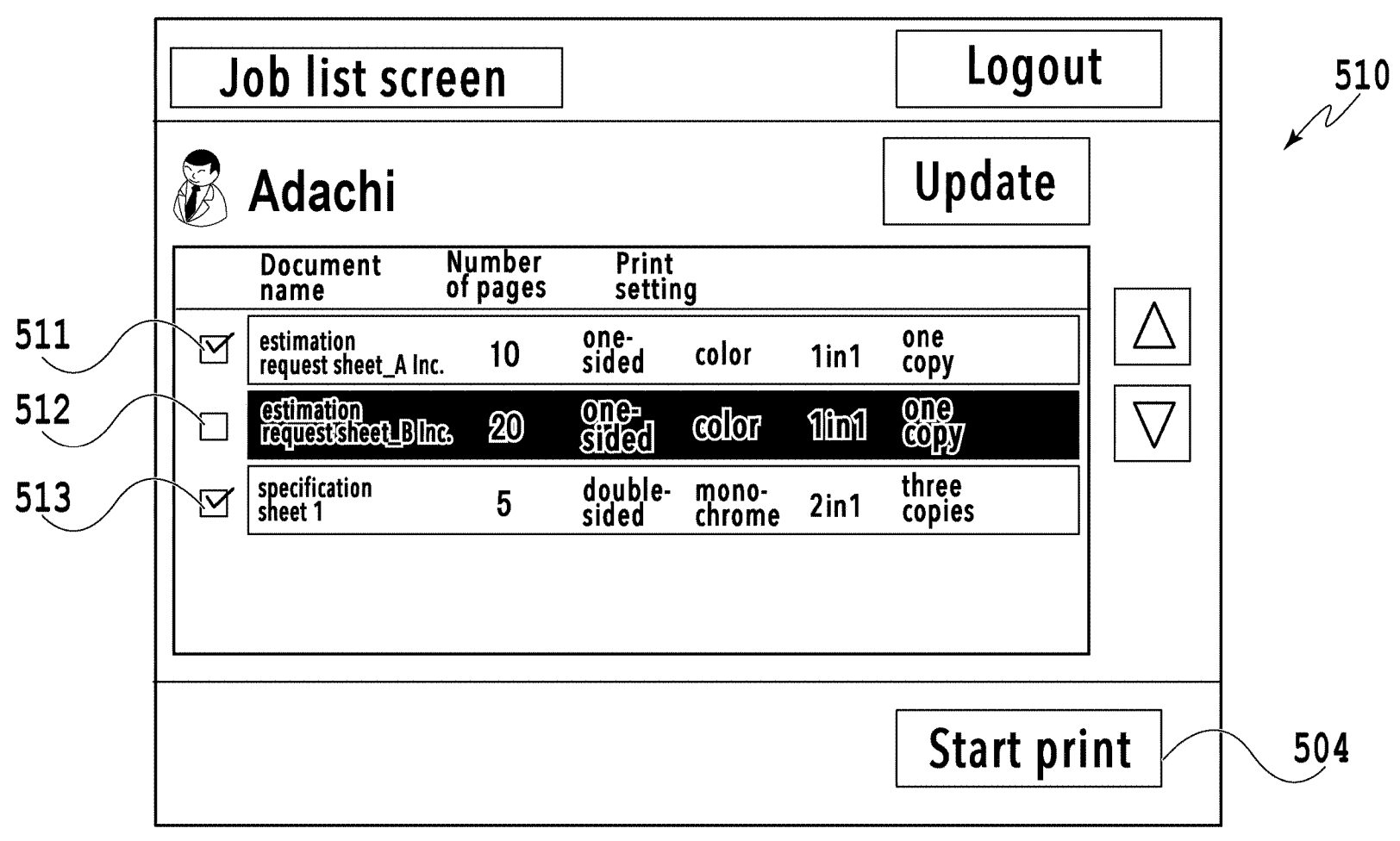
Figure 5C:

The display (display example) on the operation unit 204 is supplemented by using FIG. 5A to FIG. 5C. FIG. 5A to FIG. 5C are diagrams showing a list screen of held print jobs (that is, diagrams showing a job list for a user who has logged in to check the job list of held print jobs and to perform printing as a screen) and the list screen is displayed on the operation unit 204 of the image forming apparatus 102.

On Job list screen 500 in FIG. 5A, print jobs 501, 502, and 503 are displayed. Each of the print jobs 501 to 503 includes Document name, Number of pages per copy, Print setting and so on and is associated with a checkbox to specify whether or not to perform printing, and it is possible for a user to check or cancel the check of the checkbox by touching the checkbox. It is possible for a user to start printing only for the print job whose checkbox is checked by pressing down a Start print button 504 in the state where the checkbox is checked.

Job list screen 510 in FIG. 5B shows a state where the automatic setting (automatic updating) is performed based on the automatic setting rule after the print job data of the job list displayed on Job list screen 500 in FIG. 5A is held in the job data saving unit 310.

For example, in the print job 502 of the job list displayed on Job list screen 500 in FIG. 5A, Print setting of Document name "estimation request sheet_B Inc." is set to "double-sided, color, 2 in 1, one copy, . . . ". In this state, in the case where the print job 502 is specified as Document type "estimation request sheet" by the document type specification unit 308, the job control unit 305 automatically updates the setting values of the print job to "one-sided, color, 1 in 1, one copy, . . . " based on the automatic setting rule (Table 1).

Then, in the case where the setting values of the print job are automatically updated, the user interface 304 updates and displays the print setting values of the print job based on the information indicating that the above-described automatic setting is performed. At this time, in the case where the print setting values of the print job are simply updated and displayed, there is a possibility that a user who has logged in does not notice that the print setting values of the print job are updated. Consequently, the image forming apparatus 102 displays the automatically updated print job by highlighting the print job by coloring the background thereof black and further increasing the font size of the changed print setting values of the print job as shown on Job list screen 510 in FIG. 5B.

The print job 501 of the job list displayed on Job list screen 500 in FIG. 5A is also specified as Document type "estimation request sheet" by the document type specification unit 308. However, in this case, the setting values are the same as the setting values of the print job, which are acquired from the automatic setting rule (Table 1), and the setting values are not changed, and therefore, the print job 501 is not displayed by highlighting the print job as in the case with a print job 511 in FIG. 5B.

In addition, as a method of notifying a user who has logged in of the automatically set print job, it is also possible to display the document type specified by the document type specification unit 308 as a print job 522 of the job list displayed on Job list screen 520 in FIG. 5C. That is, it is also possible to highlight the print job 522 by increasing the font size of the updated print setting values of the print job without coloring the background thereof black and further by additionally displaying Document type ("estimation request sheet").

In FIG. 5C, also in a print job 521 of the job list displayed on Job list screen 520, Document type is displayed as "estimation request sheet" although the print setting values are not changed. However, in the print jobs 521 and 522, "estimation request sheet" is displayed in different font sizes (that is, Document type "estimation request sheet" of the print job 521 is displayed in a small font size), and due to this, it is possible to know whether or not the print setting value is changed.

Figure 6:
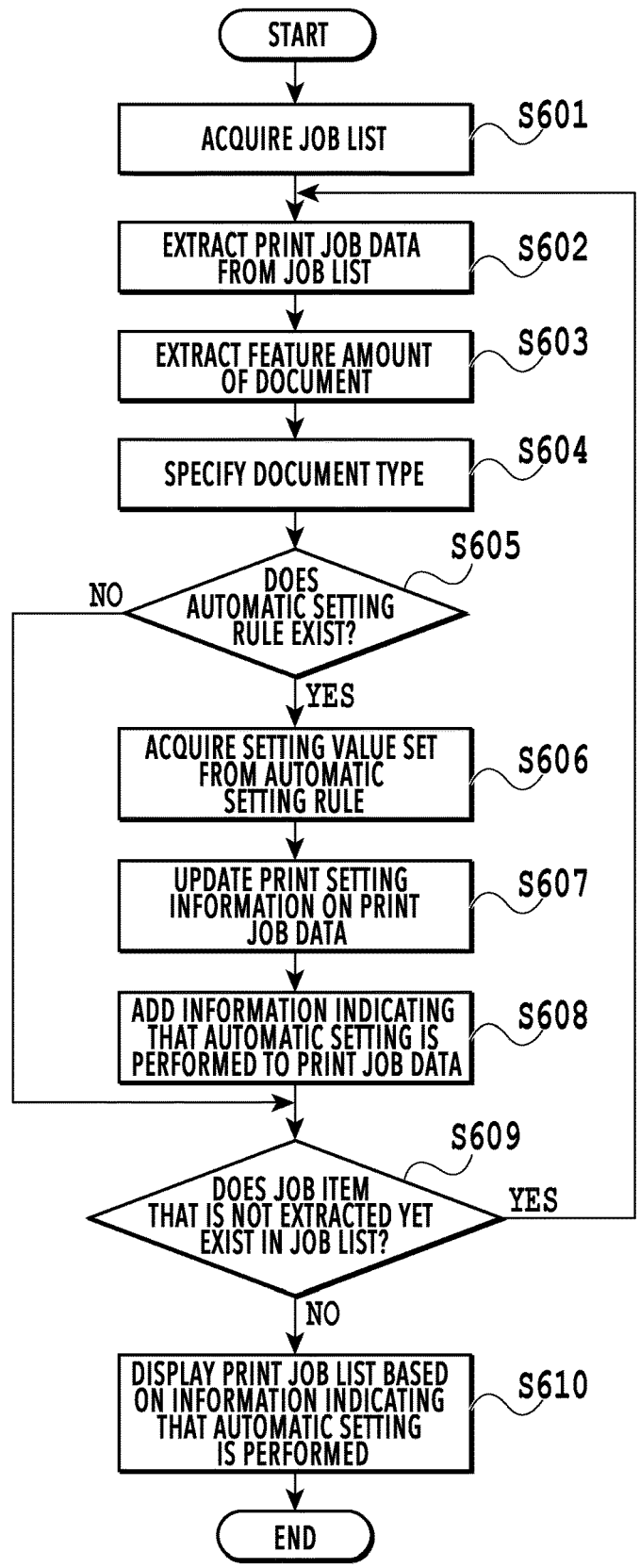
FIG. 6 is a flowchart showing a procedure of processing to update print job data.

FIG. 6 is a flowchart showing a procedure of processing to update the print job data 400 (print setting information 403) in the image forming apparatus 102. The flowchart shown in FIG. 6 is performed by a program being loaded onto the RAM 202 and being executed by the CPU 201.

The job control unit 305 acquires list information on the print job data held in the job data saving unit 310 of the auxiliary storage device 203 based on the timing of login of a user or a predetermined period of time and the like (S601). After acquiring the list information, the job control unit 305 extracts the print job data 400 from the acquired list information (S602).

The feature amount extraction unit 307 analyzes PDL data of the print job data 400 extracted by the job control unit 305 and extracts a feature amount (S603). The document type specification unit 308 specifies (determines) the document type by using the feature amount extracted by the feature amount extraction unit 307 (S604). In the case where the document type is specified by the document type specification unit 308, the automatic setting value set acquisition unit 309 determines whether or not the automatic setting rule of the specified document type exists in the automatic setting rule saving unit 311 (S605).

In the case where the automatic setting rule of the document type specified by the document type specification unit 308 exists in the automatic setting rule saving unit 311 (S605 Yes), the job control unit 305 causes the processing to advance to step S606. In the case where the automatic setting rule does not exist in the automatic setting rule saving unit 311 (S605 No), the job control unit 305 causes the processing to advance to step S609.

In the case where the processing is caused to advance to step S606, the automatic setting value set acquisition unit 309 acquires the print job setting value set from the automatic setting rule saving unit 311. The job control unit 305 automatically sets the acquired print job setting value set to the print job data of the relevant job held in the job data saving unit 310 of the auxiliary storage device 203 (updates the print job data of the relevant job by the acquired print job setting value set) (S607).

After updating the print setting value, the job control unit 305 adds information indicating that the automatic setting (updating) is performed for the print setting value to the print job data (S608). At step S607, the job control unit 305 determines whether or not the print setting value is changed before and after updating and in the case of determining that the print setting value is changed, at step S608, the job control unit 305 includes information indicating that the print setting value is changed in the information indicating that the automatic setting is performed. As described above, the job control unit 305 functions as a setting value change unit configured to change the print setting value.

The job control unit 305 checks whether or not there is a job from which print job data is not extracted yet of the list information on the print job data acquired at step S601 (S609). In the case where there is a job from which print job data is not extracted yet (S609 Yes), the job control unit 305 causes the processing to return to step S602 and in the case where there is not a job from which print job data is not extracted yet (S609 No), the job control unit 305 causes the processing to advance to step S610.

The user interface 304 controls the operation unit 204 and displays the print job by highlighting the print job as in the case with the print job 512 in FIG. 5B and the print job 522 in FIG. 5C based on the information indicating that the automatic setting is performed, which is added at step S608 (S610). That is, in the case where the information indicating that the print setting value is changed is included in the information indicating that the automatic setting is performed, the user interface 304 displays the print job by highlighting the print job. In the case where it is determined that the automatic setting rule of the document type specified by the document type specification unit 308 does not exist in the automatic setting rule saving unit 311 at step S605, the user interface 304 displays the print setting value set by a user without updating the print setting value.

Second Embodiment

Figure 7:
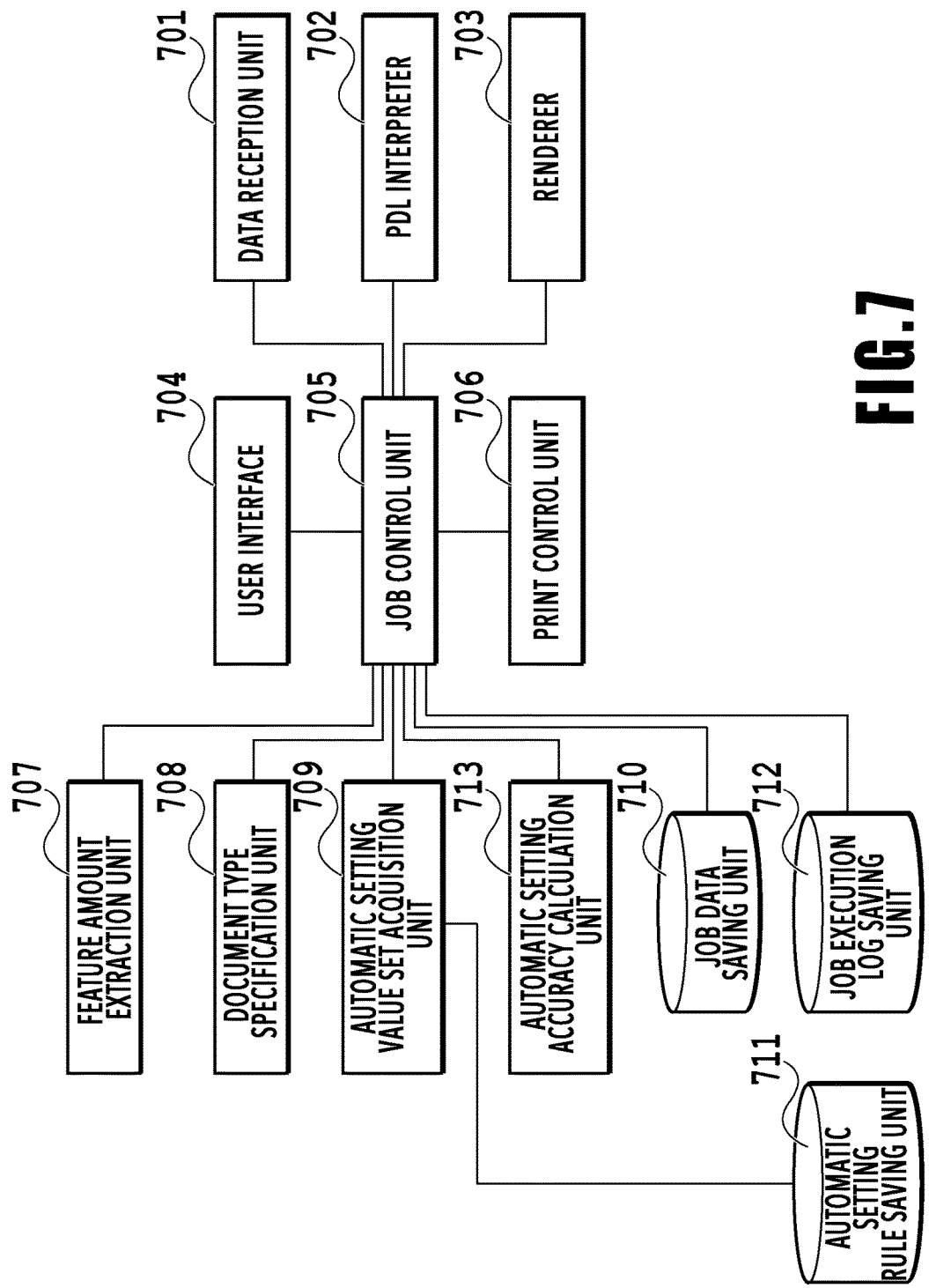
FIG. 7 is a diagram showing a function configuration of an image forming apparatus.
Figure 8:
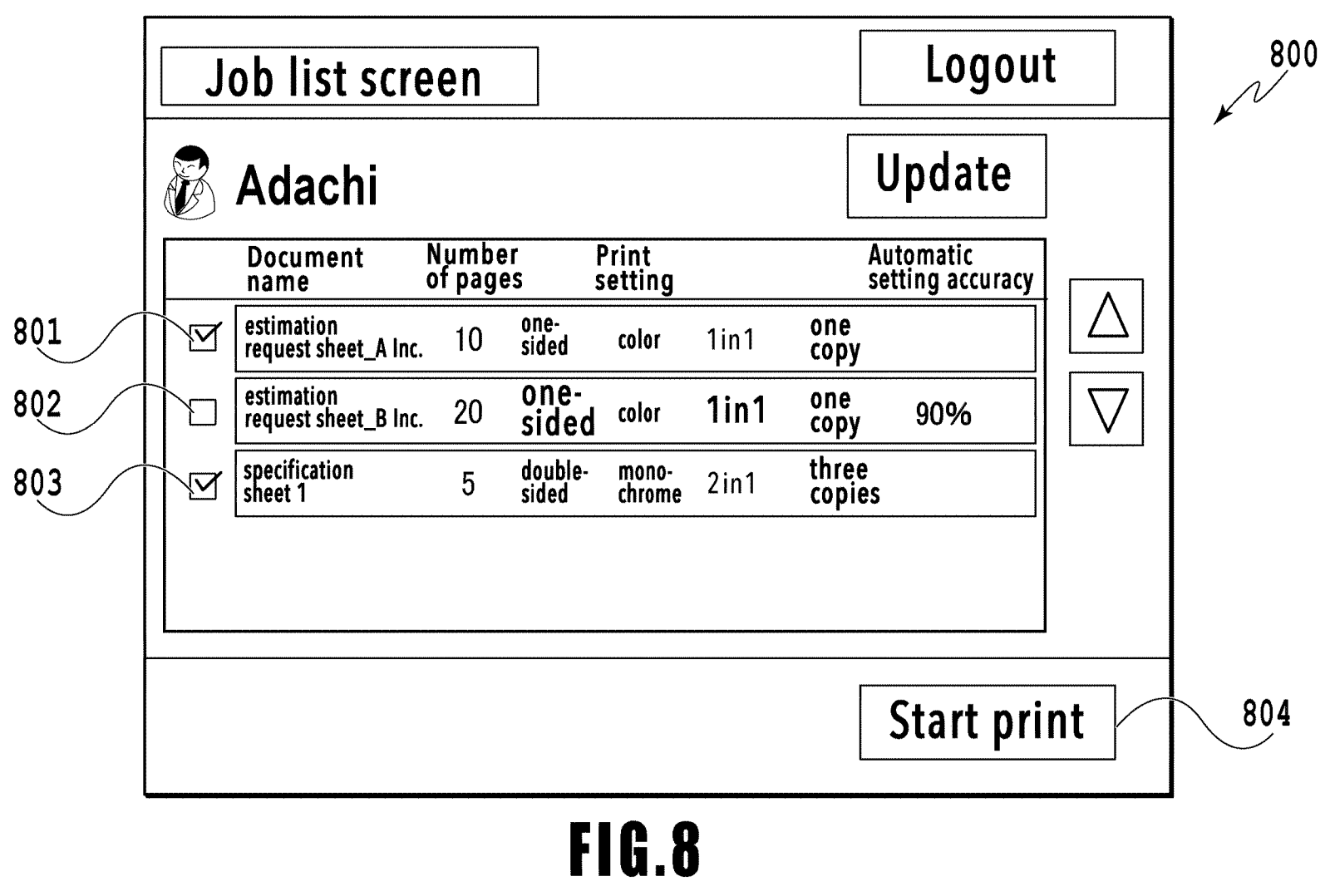
Figure 9:
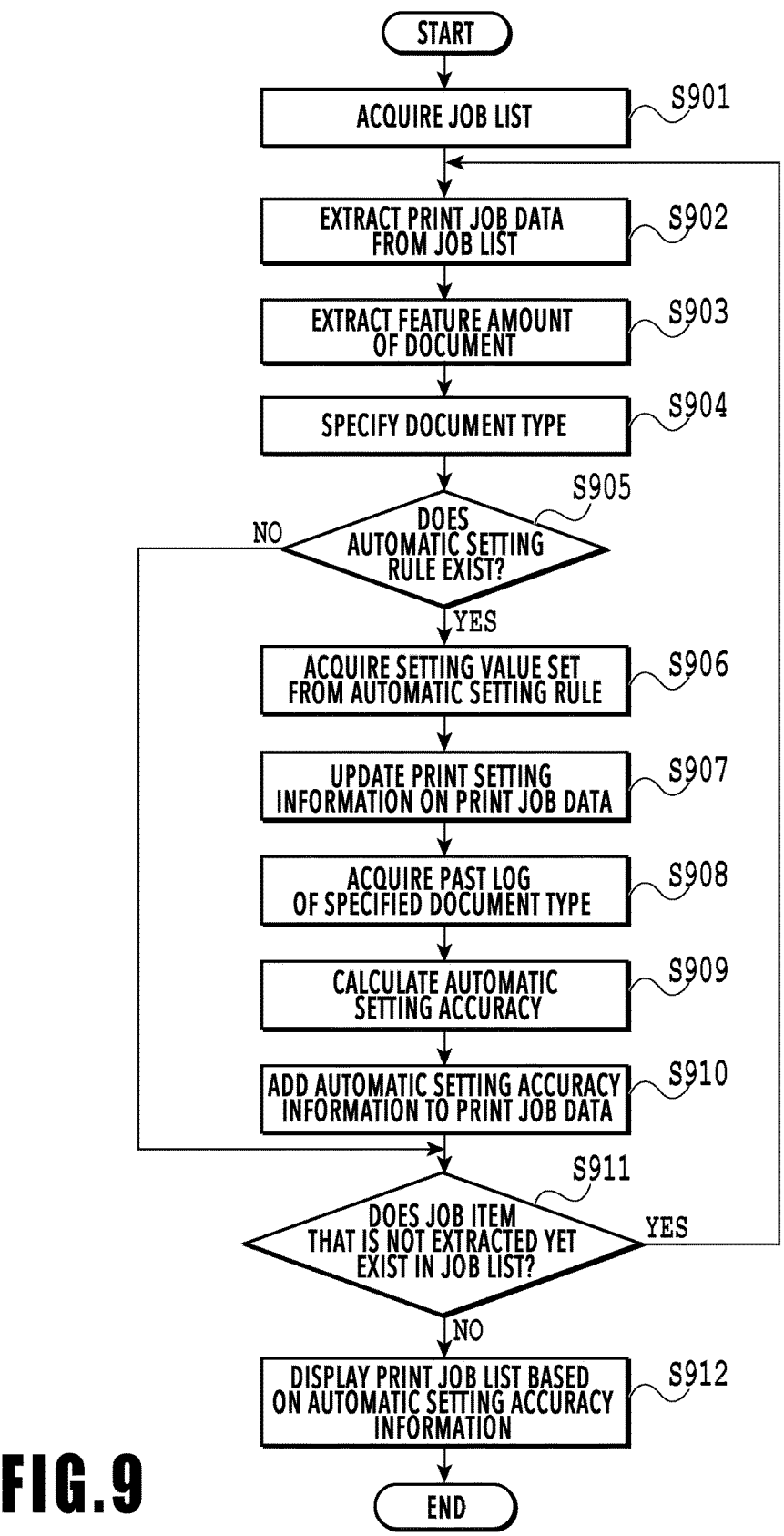
FIG. 9 is a flowchart showing a procedure of processing to update print job data.

Next, the second embodiment of the present invention is explained by using FIG. 7 to FIG. 9. In the second embodiment, as will be described later, a user is caused to recognize that the setting is changed by calculating an automatic setting accuracy and by displaying the calculated automatic setting accuracy being added to the relevant job. In the following, portions different from the first embodiment are explained mainly.

FIG. 7 is a diagram showing a function configuration of an image forming apparatus. The function configuration of the image forming apparatus shown in FIG. 7 is almost the same as the function configuration of the image forming apparatus of the first embodiment shown in FIG. 3. That is, a data reception unit 701 to an automatic setting rule saving unit 711 of the image forming apparatus shown in FIG. 7 have the same functions as those of the data reception unit 301 to the automatic setting rule saving unit 311 shown in FIG. 3.

A job execution log saving unit 712 saves log information at the time of execution of printing in the case where the printing device 207 performs printing. This log information is the information the same as the log information received by the data reception unit 701 and saved in the job data saving unit 710 and includes the print setting value settled by execution of printing, the PDL data, the document type and so on.

An automatic setting accuracy calculation unit 713 calculates an automatic setting accuracy by using the document type specified by a document type specification unit 708, the print job setting value set acquired by an automatic setting value set acquisition unit 709, and the log information of the job execution log saving unit 712.

The automatic setting accuracy indicates the reliability of the rule that associates the document type saved in the automatic setting rule saving unit 711 and the job setting value set with each other. Here, the contents of the automatic setting accuracy are supplemented. First, in the case where the document type is specified by the document type specification unit 708, the log information on the printing processing performed based on the document type is acquired from the job execution log saving unit 712. Next, regarding the log information based on the document type, the number of pieces of log information whose print setting values match with the job setting values acquired by the automatic setting value set acquisition unit 709 is counted. Further, of all the acquired pieces of log information, the number of pieces of log information whose print setting values match therewith is calculated as a ratio. Then, the calculation results are taken to be the automatic setting accuracy.

For example, in the case where the number of all acquired pieces of log information is 100 and the number of pieces of log information whose print setting values match with the job setting value set acquired by the automatic setting value set acquisition unit 709 is 90, the automatic setting accuracy calculation unit 713 calculates the automatic setting accuracy as 90%. The job setting value set acquired by the automatic setting value set acquisition unit 709 differs from the print setting values because there is a case where, for example, the print setting value for which the automatic setting is performed (taken to be a target to be changed) is further changed at the time of execution of printing.

In the present embodiment, the automatic setting accuracy is calculated as described above, but it may also be possible to use another calculation method for calculation of the automatic setting accuracy. The automatic setting accuracy calculated by the automatic setting accuracy calculation unit 713 is saved in a job data saving unit 710 via a job control unit 705.

Following the above, the display (display example) on the operation unit 204 is explained by using FIG. 8. FIG. 8 is a diagram showing a list screen of held print jobs and the list screen is displayed on the operation unit 204 of the image forming apparatus 102. In detail, FIG. 8 shows a state where the automatic setting (automatic updating) is performed based on the automatic setting rule (Table 1) after the print job data of the job list shown in FIG. 5A is held in the job data saving unit 710 of the auxiliary storage device 203.

Here, in the first embodiment, the print job for which the automatic updating is performed is displayed by highlighting the print job by coloring the background black as in the case with the print job 512 in FIG. 5B, but in the present embodiment, the automatic setting accuracy is displayed as a percentage as in the case with a print job 802 in FIG. 8. Due to this, it is possible to cause a user to notice (recognize) that the print job is automatically updated. Further, by displaying the automatic setting accuracy in this manner, it is also made possible for a user to grasp the reliability (accuracy) of the automatically set setting value.

FIG. 9 is a flowchart showing a procedure of processing to update the print job data 400 (print setting information 403) in the image forming apparatus 102. The flowchart shown in FIG. 9 is performed by a program being loaded onto the RAM 202 and being executed by the CPU 201.

In FIG. 9, the processing at steps S901 to S907 is processing equivalent to the processing at steps S601 to S607 in FIG. 6. Further, the processing at steps S911 and S912 in FIG. 9 is also processing equivalent to the processing at steps S609 and S610 in FIG. 6. Because of this, the processing at steps S908 to S910 is explained mainly.

At step S907, the automatic setting is performed for the print job data of the relevant job held in the job data saving unit 710 by the job control unit 705 and in the case where it is determined that the print setting value is changed before and after updating, the processing is caused to advance to step S908.

At step S908, the job control unit 705 acquires the log information on the printing processing performed based on the document type specified at step S904 of the log information saved in the job execution log saving unit 712 (that is, log information on the processing performed in the past). Then, at step S909, the automatic setting accuracy calculation unit 713 calculates an automatic setting accuracy as described above. Then, the automatic setting accuracy calculated at step S909 is added to the print job data and saved in the job data saving unit 710 via the job control unit 705 (S910).

After this, as in the case with step S609, whether or not there is a job from which print job data is not extracted yet of the list information on the print job data acquired at step S901 is checked (S911). In the case where there is a job from which print job data is not extracted yet (S911 Yes), the job control unit 705 causes the processing to return to step S902 and in the case where there is not a job from which print job data is not extracted yet (S911 No), the job control unit 705 causes the processing to advance to step S912.

The user interface 704 controls the operation unit 204 and displays the print job by highlighting the print job as in the case with the print job 802 in FIG. 8 based on the information indicating that the automatic setting with an automatic setting accuracy being added is performed at step S910 (S912).

As described above, in the first and second embodiments, in the case where there is a job in the job list of print jobs, whose print setting value is changed, the job is displayed by highlighting the job by changing the background color and the font size, or by adding the document type and the automatic setting accuracy. Due to this, it is made possible to cause a user to notice (recognize) that the setting value of the print job is changed.

The method of displaying a job by highlighting the job is not necessarily limited to the above-described method. Consequently, for example, it may also be possible to cause a user to notice that the print setting value of the print job is changed by displaying a popup screen at the time of a transition into the job list screen as shown in FIG. 5B, FIG. 5C, and FIG. 8. In addition, it may also be possible to display a job by highlighting the job by coloring the print setting value itself or by adding various marks to the relevant job. Further, it may also be possible to highlight a job by displaying a comparison between the setting values of the print job before and after the change. In the case where a comparison between the setting values of the print job before and after the change is displayed, it may also be possible to display the comparison on the job list screen or on the popup screen. In addition, it may also be possible to combine the above-described method with the method of displaying a job by highlighting the job. Because of this, for example, it may also be possible to combine the method of the first embodiment and the method of the second embodiment (that is, it may also be possible to add an automatic setting accuracy to the relevant job and further to color the background of the job black).

Further, in the second embodiment, in the case where there is a job in the job list of print jobs, whose print setting value is changed, the job is displayed with an automatic setting accuracy being added thereto, but it may also be possible to return the changed print setting value to the original print setting value by taking into consideration the value of the automatic setting accuracy. For example, in the case where the threshold value of the automatic setting accuracy is set to 80% and the calculated automatic setting accuracy is less than 80%, it may also be possible to determine that the reliability of the automatically set print setting value is low (inappropriate) and to return the print setting value to the print setting value before the automatic setting (change). Then, in this case, the job is not displayed with an automatic setting accuracy being added. It is possible for a user to set the threshold value of the automatic setting accuracy.

Third Embodiment

In the present embodiment, the display method of a list screen of held print jobs is changed in the same configuration as that of the second embodiment. In the following, portions different from the second embodiment are explained mainly.

FIG. 10A shows a state where the automatic setting of a document type is applied on a list screen 1000 of held print jobs as in FIG. 5A to FIG. 5C and FIG. 8. In the present embodiment, the basic configuration is the same as that of the first embodiment (FIG. 5A to FIG. 5C) and the second embodiment (FIG. 8), but the present embodiment is different from the first embodiment and the second embodiment in that a pull-down menu display button 1002 is given to a print job item 1001.

In FIG. 10A, in the case where a user presses down the pull-down menu display button 1002, the list screen 1000 of held print jobs changes into a screen shown in FIG. 10B. In FIG. 10B, symbol 1013 refers to a pull-down menu indicating that it is possible to select not only the rule of "estimation request sheet", which is an automatically set candidate, but also the rules of "specification sheet" and "contract sheet", which are other candidates. Further, in each item of the pull-down menu, an automatic setting accuracy is also displayed, not only the name of the rule. The name of the rule, the print setting value of the rule, the display contents of the pull-down menu, the display format and so on shown in FIG. 10B are not necessarily limited to those.

Then, in the case where a user selects "specification sheet" from the pull-down menu 1013 on a list screen 1010 of held print jobs in FIG. 10B, the screen changes into a screen (list screen 1020 of held print jobs) shown in FIG. 10C. In FIG. 10C, in a pull-down menu 1023, "specification sheet" selected by the user is displayed in text and resulting from the user selecting "specification sheet", the rule applied to (displayed in) a print job item 1021 is also changed. That is, by displaying "double-sided", "1 in 1", and "two copies" of the print setting values in an increased font size in the print job item 1021, it is indicated that the rule is automatically set in association with the rule of "specification sheet". Then, in the case where a user presses down a Start print button 1024 in the state shown in FIG. 10C, the image forming apparatus 102 performs printing processing based on the print setting values shown on the list screen 1020 of held print jobs.

As described above (that is, as shown in FIG. 10A to FIG. 10C), it is possible for a user not only to recognize that the automatic setting rule of the print setting values is applied and the print setting values are changed but also to check the information relating to other candidates (rules). Because of this, it is possible for a user to perform an operation, such as changing a rule to another rule having a high automatic setting accuracy and setting again a rule to which the automatic setting rule is applied after checking the automatic setting accuracy of another rule.

Next, by using FIG. 11A and FIG. 11B, a procedure of processing to generate the list screen 1000 of held print jobs is explained. FIG. 11A and FIG. 11B are flowcharts showing a procedure of processing to generate the list screen 1000 of held print jobs by automatically setting print setting values to a print job and storing a rule list that can be applied to the print job in a pull-down menu.

The flowcharts shown in FIG. 11A and FIG. 11B are performed by a processing-target program being loaded onto the RAM 202 and being executed by the CPU 201. Further, in FIG. 11A and FIG. 11B, the processing at steps S1101 to S1104 is the same as the processing at steps S601 to S604 in FIG. 6 and the processing at steps S1111 and S1112 is the same as the processing at steps S609 and S610 in FIG. 6, and therefore, explanation thereof is omitted here.

The job control unit 705 acquires the automatic setting rules stored in the automatic setting rule saving unit 711 as a list (S1105). In the case where the automatic setting rules are acquired by the job control unit 705 as a list, the automatic setting accuracy calculation unit 713 acquires one of the rules (S1106) and further calculates an automatic setting accuracy from a comparison with the document type specified at step S1104 (S1107). As the calculation method of an automatic setting accuracy here, as described above, it is considered to use the degree of matching between the set of logs in the past of print jobs relating to the document type and the print job data, and the like. However, the calculation method of an automatic setting accuracy is not necessarily limited to this.

Then, at step S1108, with the print job data extracted at step S1102, the print job setting value set of the automatic setting rule compared with the document type specified at step S1104 and the automatic setting accuracy of the automatically set rule are associated. The job control unit 705 determines whether or not all the automatic setting rules in the list acquired at step S1105 have been checked (S1109). Then, in the case of determining that all the automatic setting rules in the list acquired at step S1105 have been checked (S1109 Yes), the job control unit 705 sorts the automatic setting rules associated with the print job data according to the automatic setting accuracy (S1110).

At step S1113, the job control unit 705 generates a list that is displayed in the pull-down menu 1013 based on the results of sorting the automatic setting rules according to the automatic setting accuracy. Further, at step S1114, the job control unit 705 applies the automatic setting rule having a higher automatic setting accuracy of the results of the sort to the print setting values.

Next, by using a list screen of held print jobs in FIG. 12, supplementary explanation is given for the image forming apparatus according to the present embodiment. In FIG. 10A to FIG. 10C described above, it is possible to select an automatic setting rule from a plurality of candidates (automatic setting rules) by pressing down the pull-down menu display button 1002, but FIG. 12 shows a case where there is only one candidate and it is not possible to select another candidate.

Here, the case where it is not possible to select another candidate is, for example, a case of a document type for which only one kind of print setting value set exists, a case where the change of the print setting is limited by the specification of the system and the like, and so on. Further, in this case, for example, as shown in FIG. 12, the term (here "fixed" 1201) indicating the state where it is not possible to change the print setting value set is added to and displayed in the estimation request sheet of "Document type". The display method is not necessarily limited to this and it is also possible to display a character in gray-out or to display an alert in the case where a user tries to change the setting value. Further, by displaying "fixed" in this manner, it is possible for a user to recognize that there is no room to change the currently set print setting value set.

Fourth Embodiment

In the present embodiment, items that can be changed of the print setting values are changed in the same configuration as those of the second embodiment and the third embodiment. In the following, portions different from the second embodiment and the third embodiment are explained mainly.

FIG. 13 is a diagram showing a list screen of held print jobs and shows a display state in the case where the print setting value is changed after applying the automatic setting rule. Further, here, a state after "estimation request sheet" is selected from the pull-down menu 1013 and further, the item of "one-sided" of a job list 1011 is pressed down in FIG. 10B is supposed. The document names, the print setting values and so on shown in FIG. 13 are used for illustrating the present embodiment and these document names, the print setting values and so on are not necessarily limited to those.

In FIG. 13, symbol 1301 indicates a pull-down menu display button of print setting values. In the case where a user presses down the pull-down menu display button 1301 of print setting values, a pull-down menu 1302 is displayed and a state is brought about where print setting values, which are candidates, including the currently set print setting value, and the automatic setting accuracies thereof are displayed. Due to this, it is possible for a user to select an appropriate print setting value from a plurality of candidates and to apply the print setting after checking the automatic setting accuracy.

FIG. 14 is a diagram illustrating a data table 1401 for displaying print setting values and automatic setting accuracies in the pull-down menu 1302. It is assumed that the data table 1401 is stored in the automatic setting rule saving unit 711 in a state of being associated with a specific document type and FIG. 14 shows an example in which print setting values and automatic setting accuracies associated with the automatic setting rule of the estimation request sheet in FIG. 13 are stored.

The data table 1401 stores a sub table 1402 of print setting and it is assumed that the sub table 1402 stores setting value information on one-sided/double-sided setting 1402 (a), color/white and black setting 1402 (b), and Nup setting 1402 (c). The data structure shown in FIG. 14 is merely an example and the data structure is not necessarily limited to this. Further, it is possible to include another piece of information in the data table 1401, but this is omitted here.

In the following, of the sub table 1402, the one-sided/double-sided setting 1402 (a) is explained. In the sub table 1402 of the one-sided/double-sided setting 1402 (a), setting values that can be set in the one-sided/double-sided setting are stored as items and automatic setting accuracies thereof are also stored. Specifically, in the example shown in FIG. 14, the automatic setting accuracy of the one-sided setting is set to 80%, the automatic setting accuracy of double-sided long side binding is set to 15%, and the automatic setting accuracy of double-sided short side binding is set to 5%.

The calculation method of an automatic setting accuracy here is not necessarily limited to one method. Consequently, for example, it is possible to calculate an automatic setting accuracy by collecting log information in the case where some print job is determined to be an estimation request sheet and by counting the frequency of appearance of each setting value of the log information. Specifically, it is assumed that the number of logs of the print job determined to be an estimation request sheet is 100, and of those logs, the number of logs for which one-sided is set is 80, the number of logs for which double-sided long side binding is set is 15, and the number of logs for which double-sided short side binding is set is five. In this case, the automatic setting accuracy of one-sided is set to 80%, the automatic setting accuracy of double-sided long side binding is set to 15%, and the automatic setting accuracy of double-sided short side binding is set to 5%. By storing print setting values and automatic setting accuracies in the above-described data structure, it is possible to display print setting values and automatic setting accuracies in the pull-down menu 1302 on the print job screen.

Fifth Embodiment

Figure 15B:
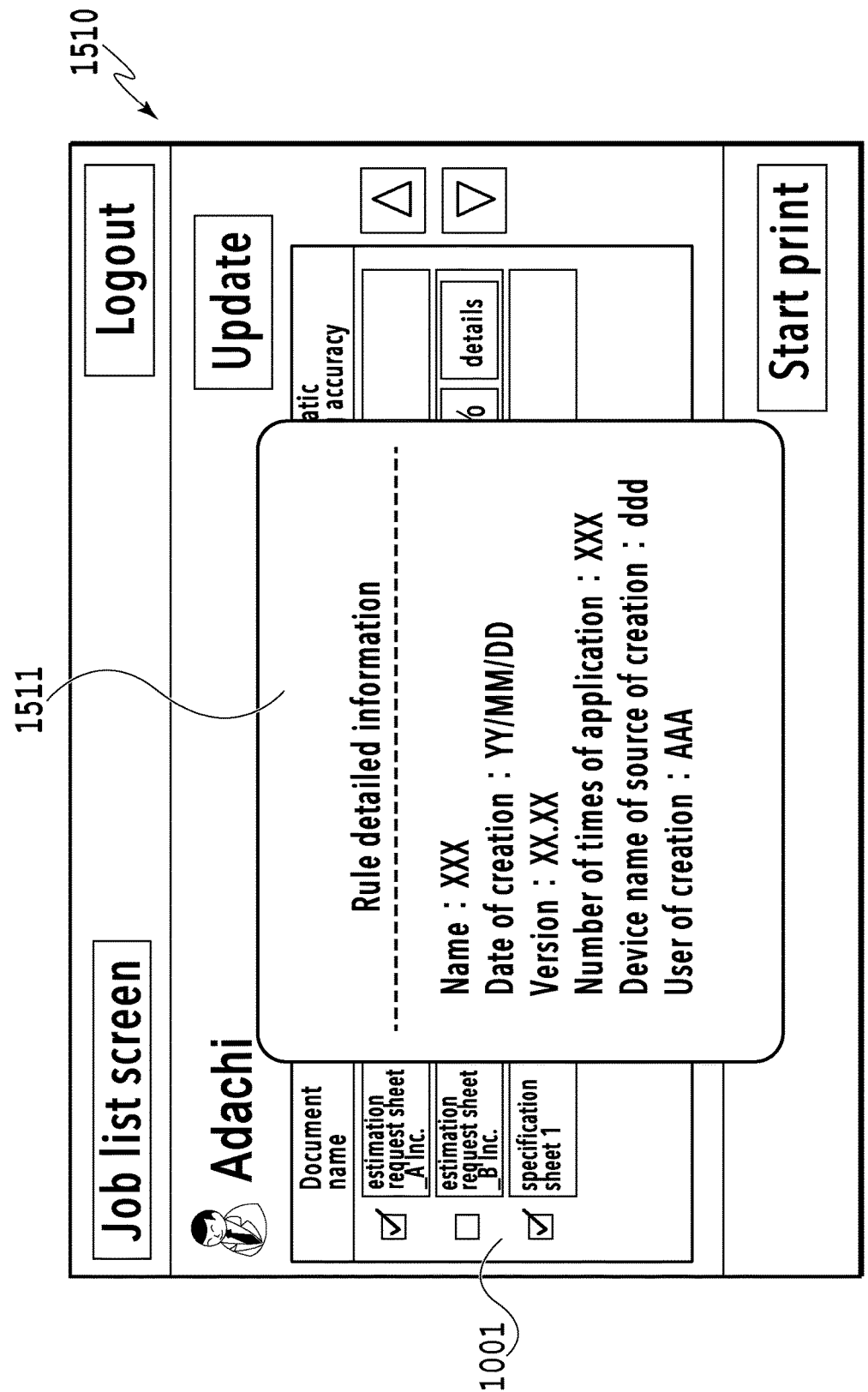

In the present embodiment, the display method of a list screen of held print jobs is changed in the same configuration as those of the second to fourth embodiments. In the following, portions different from the second to fourth embodiments are explained mainly. FIG. 15A and FIG. 15B are diagrams showing a list screen of held print jobs and FIG. 15A illustrates a screen to which a button ("details") to provide rule detailed information to a user is added. As shown in FIG. 15A, for a print job 1501, automatically updated print setting values are set as in the case with FIG. 10A to FIG. 10C and on the other hand, it is made possible to press down a button 1502 for displaying rule detailed information. The arrangement or the like of the button 1502 on the list screen of held print jobs is not limited to the example shown schematically.

Here, a display example of the list screen of held print jobs after the button 1502 is pressed down in FIG. 15A is shown as FIG. 15B. In FIG. 15B, a rule detailed information popup screen 1511 is displayed and on the rule detailed information popup screen 1511, automatically updated rule detailed information is displayed as described above.

As display items of rule detailed information, it is possible to suppose Name (document name), Date of creation, Version, Number of times of application, Device name of source of creation, User of creation and so on, although the display items are not limited to the example, shown schematically. Further, what is added to a rule is a unique one.

Specifically, Date of creation is the date of creation of the rule and Version is the unique number for specifying contents of revision at the time of revision of the rule. In addition, Number of times of application indicates the number of times the rule is applied and for example, in the case where the number of print jobs to which the rule whose Name is XXX is applied is 500, Number of times of application is displayed as 500.

Further, Device name of source of creation is information specifying the image forming apparatus by which the rule is created in the case where there is a plurality of image forming apparatuses on a network, and User of creation is displayed as an ID or the like of the user who has created the rule. As a supplement, in the case where the rule is automatically generated from the log information in the past, User of creation and Device name of source of creation are not specified sometimes.

It is considered that such rule detailed information is useful for determining whether to continue printing by applying the automatically updated rule or to perform printing by applying another rule. For example, in the case where Number of times of application of the rule is small or Date of creation is in the distant past although the automatic setting accuracy is very high, it is possible to determine not to apply the rule. On the other hand, in the case where Number of times of application is large although the automatic setting accuracy is not so high, it is possible to determine to apply the rule.

As explained above, according to the present invention, even in the case where the setting values of a held print job are automatically set by setting values different from those at the time of input of the job, it is possible to cause a user to recognize (notice) that the setting is changed. Further, it is also possible for a user to modify the setting in the case where setting not intended by the user is performed by the automatic setting. In addition, in view of the case where the automatically set print setting values are modified, it is also possible to provide a candidate of an appropriate print setting value and information necessary for selecting the candidate (that is, automatic setting accuracy).

In addition, in the first and second embodiments, the specifications are such that after the print setting value is updated, whether or not the print setting value is changed is determined and the print job whose print setting value is changed is displayed by highlighting the print job, but the processing to display a print job by highlighting the print job is not necessarily limited to this. Consequently, for example, it may also be possible to determine whether or not the print setting value of a print job is changed based on the acquired automatic setting rule without performing updating processing of the print setting value and to change the print setting value of a print job whose print setting value is determined to be changed and to display the print job by highlighting the print job.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

According to the present invention, in the case where the print setting value is changed by print automatic setting in hold printing, it is possible to cause a user to recognize that print setting value is changed. In addition, in view of the case where the automatically set print setting value is modified, it is also possible to provide a candidate of an appropriate print setting value and information necessary for selecting the candidate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-198400, filed Oct. 12, 2017, and No. 2018-108996, filed Jun. 6, 2018, which are hereby incorporated by reference herein in their entirety.

What is claimed is:

1. An image forming apparatus capable of performing hold printing that holds a received print job and performs the print job in accordance with instructions to perform printing from a user, the image forming apparatus comprising:
    a document type specification unit configured to specify a document type from the print job;
    a setting rule acquisition unit configured to acquire a setting rule in which print setting values are associated with a document type;
    a setting value change unit configured to change a print setting value of the print job based on a setting rule of a document type corresponding to a document type specified by the document type specification unit, which is acquired by the setting rule acquisition unit; and
    a display control unit configured to perform control so as to display the print job whose print setting value is changed by highlighting the print job.

2. The image forming apparatus according to claim 1, further comprising:
    a feature amount extraction unit configured to extract a feature amount of a document from the print job, wherein
    the document type specification unit specifies the document type based on the feature amount.

3. The image forming apparatus according to claim 1, wherein
    the display control unit displays the print job whose print setting value is changed by coloring a background of the print job.

4. The image forming apparatus according to claim 1, wherein
    the display control unit displays the print job whose print setting value is changed by making at least one of a font size and a font color of the print job different from a font size and a font color of a print job whose print setting value is not changed.

5. The image forming apparatus according to claim 1, wherein
    the display control unit displays the print job whose print setting value is changed by adding a document type specified by the document type specification unit to the print job.

6. The image forming apparatus according to claim 1, wherein
    the display control unit performs control so as to display the print job whose print setting value is changed by adding an automatic setting accuracy to the print job, and
    the automatic setting accuracy is reliability indicating whether or not the changed print setting value is appropriate as a print setting value for a document type specified by the document type specification unit.

7. The image forming apparatus according to claim 6, wherein the automatic setting accuracy is a ratio of log information on printing processing performed based on a print setting value associated with the document type specified in the setting rule to log information on printing processing performed based on a document type specified by the document type specification unit.

8. The image forming apparatus according to claim 1, wherein the display control unit displays the print job whose print setting value is changed on a popup screen.

9. The image forming apparatus according to claim 1, wherein the display control unit displays print setting values before and after the print job is changed.

10. The image forming apparatus according to claim 6, wherein the setting value change unit, in a case where a plurality of document types is specified by the document type specification unit, changes a print setting value of the print job based on a setting rule of a document type whose automatic setting accuracy is higher of the plurality of document types, and the display control unit displays the print job whose print setting value is changed together with a document type to which an automatic setting accuracy for the document type is added, for which the setting rule is not taken to be a change target as a print setting value of the print job as a candidate that can be changed as a print setting value of the print job.

11. The image forming apparatus according to claim 1, wherein the display control unit, in a case where a plurality of document types is specified by the document type specification unit and where it is not possible to change a setting rule of a document type not taken to be a change target as a print setting value of the print job as a print setting value of the print job, displays that it is not possible to change to the print setting value.

12. The image forming apparatus according to claim 6, wherein the display control unit displays a print setting value to which an automatic setting accuracy for the print setting value is added as a candidate that can be changed as a print setting value of the print job in a document type that can be changed as a print setting value of the print job, which holds a plurality of print setting values and an automatic setting accuracy for each of the plurality of print setting values.

13. The image forming apparatus according to claim 1, wherein the display control unit displays detailed information relating to a setting rule of a document type that can be changed on a popup screen.

14. An image forming apparatus capable of performing hold printing that holds a received print job and performs the print job in accordance with instructions to perform printing from a user, the image forming apparatus comprising:

a user interface that displays the held print job, wherein the user interface displays a print job whose print setting value is changed to that different from the print setting value set by a user in the print job by highlighting the print job.

15. A control method in an image forming apparatus capable of performing hold printing that holds a received print job and performs the print job in accordance with instructions to perform printing from a user, the control method comprising:

a document type specification step of specifying a document type from the print job;

a setting rule acquisition step of acquiring a setting rule in which print setting values are associated with a document type;

a setting value change step of changing a print setting value of the print job based on a setting rule of a document type corresponding to a document type specified at the document type specification step, which is acquired at the setting rule acquisition step; and a display control step of performing control so as to display the print job whose print setting value is changed by highlighting the print job.

16. A non-transitory computer readable storage medium storing a program for causing a computer to function as an image forming apparatus, wherein the image forming apparatus is an image forming apparatus capable of performing hold printing that holds a received print job and performs the print job in accordance with instructions to perform printing from a user, the image forming apparatus comprising:

a document type specification unit configured to specify a document type from the print job;

a setting rule acquisition unit configured to acquire a setting rule in which print setting values are associated with a document type;

a setting value change unit configured to change a print setting value of the print job based on a setting rule of a document type corresponding to a document type specified by the document type specification unit, which is acquired by the setting rule acquisition unit; and a display control unit configured to perform control so as to display the print job whose print setting value is changed by highlighting the print job.

* * * * *